Figure 1:
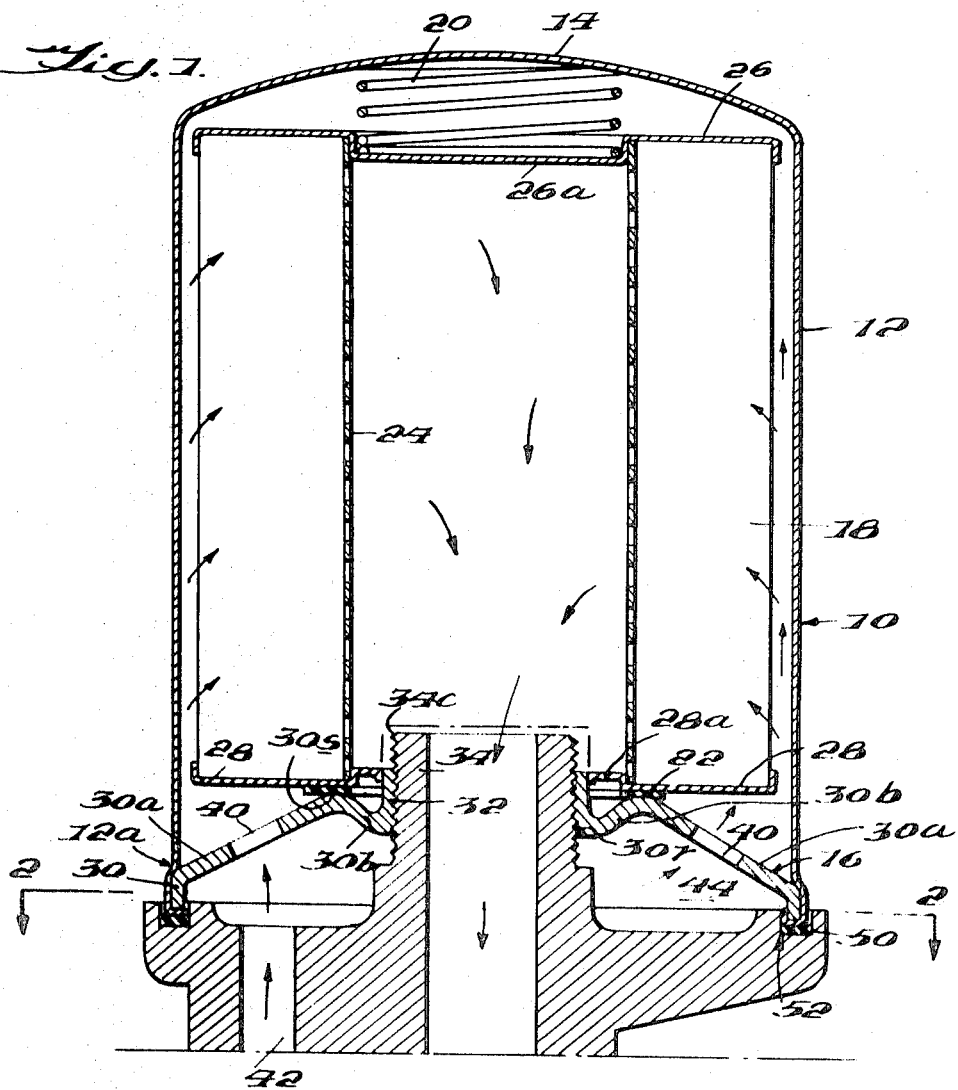

United States Patent

[11] 3,616,933

[72] Inventor Jesse A. Baldwin
　　　　　　　Kearney, Nebr.
[21] Appl. No. 864,661
[22] Filed Oct. 8, 1969
[45] Patented Nov. 2, 1971
[73] Assignee J. A. Baldwin Manufacturing Company
　　　　　　　Kearney, Nebr.

[54] SPIN-ON THROWAWAY-TYPE OIL FILTERS
　　　4 Claims, 2 Drawing Figs.
[52] U.S. Cl. .................................................. 210/440,
　　　　　　　　　　　　　　　　　　　　　　　　　　210/DIG. 17
[51] Int. Cl. ........................................................ B01d 27/08
[50] Field of Search .......................................... 210/440,
　　　　　　437, 443, 450, 451, 487, 453, DIG. 10

[56] References Cited
UNITED STATES PATENTS
3,288,299　11/1966　Paton et al. ..................... 210/487
3,411,632　11/1968　Offer et al. ..................... 210/440

Primary Examiner—Reuben Friedman
Assistant Examiner—T. A. Granger
Attorney—J. Harold Kilcoyne ABSTRACT: A spin-on throwaway-type liquid (oil) filter using a one-piece, heavy-gauge baseplate whose sectional configuration is such as to provide a reversely coned, inwardly directed, annular formation intermediate its outer periphery and its central portion, and said central portion having the form of an inturned neck, said reversely coned annular formation defining an axially inward, circular line-form seat for the annular filter element of said filter, said centrally inturned neck comprising a cylindrical extension which projects axially inward and is formed integral with the smaller diameter circular line of said annular formation, and the bore of said neck being threaded for the reception of an engine-block nipple.

PATENTED NOV 2 1971 3,616,933

INVENTOR
JESSE H.
BALDWIN,
BY J. Harold Kilcoyne
ATTORNEY

SPIN-ON THROWAWAY-TYPE OIL FILTERS

This invention relates to improvements in oil filters for internal combustion engines, and more particularly in oil filters of the so-called spin-on throwaway type characterized by the filter element thereof being permanently secured within the filter shell or "can" and by its capability of being mounted directly to the engine block simply by screwing same on to an appropriately threaded nipple provided on said block and of being readily demountable by a simple screwing-off operation when filter replacement is required.

Spin-on throwaway filters as aforesaid are well known and are commercially available in at least two main forms as follows:

1. Filters whose shells or cans, conventionally of drawn thin-wall construction and open at one end, usually the bottom end, are closed at said open end by a baseplate assembly comprising a thick-wall, i.e. heavy-gauge, metal annulus secured along its planar outer-edge portion and in oiltight relationship to the can along its open-end edge by a separately formed sheet-metal annular closure plate which is spot-welded to the under face of the baseplate and which, rather than said base plate, is lock-seamed to the open edge of said can.

In filters of the form under discussion, the sheet-metal annular closure plate of the baseplate assembly conventionally carries the means for sealing the filter as a whole to the engine block upon mounting of the latter thereto, such means usually comprising a factory-assembled gasket or O-ring seated in a circular groove or channel provided in said closure plate. Typical patents disclosing and/or claiming filters whose thin-wall shells or cans are closed at their open ends by a baseplate assembly as generally described in the foregoing, are as follows: Chase et al. U.S. Pat. No. 2,877,902, dated Mar. 17, 1959, Hathaway U.S. Pat. No. 3,146,194, dated Aug. 25, 1964, Baldwin, U.S. Pat. No. 3,204,771, dated Sept. 7, 1965, Hultgren U.S. Pat. No. 3,315,809, dated Apr. 25, 1967, and Wilkenson et al. U.S. Pat. No. 3,426,900, dated Feb. 11, 1969.

2. Filters whose drawn thin-wall shells or cans are closed at their one open end by a one-piece thick-wall, i.e. heavy-gauge, metal baseplate which, although mechanically secured for handling purposes to the open-end edge of the can, is sealed oiltight thereto only responsive to the filter being screwed to the engine block nipple into its operating position. Typical prior art patents disclosing and/or claiming filters of this form are as follows: Bowers et al. U.S. Pat. No. 3,067,880, dated Dec. 11, 1962, Offer et al. U.S. Pat. No. 3,411,632, dated Nov. 19, 1968, and Filterwerk Mann & Hummel G.m.b.H. British No. 965,328, dated July 29, 1964 (particularly the FIG. 3 embodiment thereof).

While of the two filter forms generally described above the first-described form of filter employing the baseplate assembly and which also includes the factory-installed gasket serving to seal the filter to the engine block is by far the better known and more widely used, it represents expensive construction and further one that is not well-suited to so-called heavy-duty applications such as for use on farm tractors, jeeps, small military personnel carriers and similar off-the-highway vehicles, for which uses or applications filters incorporating the one-piece plate of the second form described above are better suited. However, as previously constructed, filters employing the one-piece baseplate have a major objectionable feature, namely, that arising from the difficulty in properly initiating the threading-on or screwing-on operation without cross-threading or mismating the threads of the baseplate neck with those of the engine-block nipple onto which the filter is to be screwed. Upon initial cross-threading or mismating of the threads of the baseplate neck and engine-block nipple occurring and the screwing-on operation unwittingly continued, the filter may be screwed or spun to a cocked, i.e. a noncoaxial with respect to the nipple axis, position in which it fails to seal oiltight to the engine block throughout a portion of its circumference. Again, cross-threading or mismating of the threads of the baseplate neck with those of the engine-block nipple may and can result in such mutilation of the nipple threads as to interfere with subsequent filter replacements when such are required.

Stated broadly, an object of the present invention is the provision of an oil filter of the so-called spin-on throwaway type of the form thereof employing the one-piece baseplate, but which overcomes the objectionable feature of such filters as previously constructed by the employment of a one-piece baseplate characterized by a sectional configuration as endows it with great strength, as insures the filter element being sealed oiltight to the upper surface thereof, and which further incorporates means enabling the screwing-on operation necessary to the filter being mounted directly to an engine block to be initiated with minimal danger or possibility of the threads of the baseplate neck and the threads of the engine-block nipple being cross-threaded or mismated.

Figure 2:
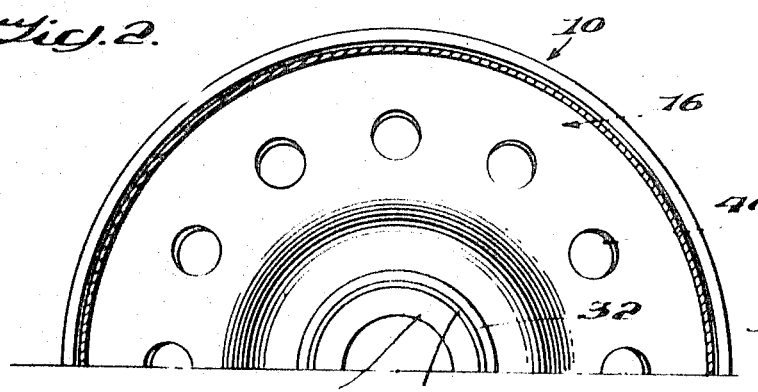

Various other objects and advantages of an oil filter of the spin-on throwaway type characterized by a one-piece baseplate according to the present invention will appear from the following description thereof taken with the accompanying drawing intended to illustrate the salient features thereof, wherein:

FIG. 1 is a vertical section taken through a filter as herein proposed shown to be mounted on and sealed oiltight to an engine block; and FIG. 2 is an irregular section taken through the mounted filter along line 2—2 of FIG. 1.

Referring to the drawing, an oil filter therein designated 10 constructed according to the invention illustratively comprises: a drawn thin-wall cylindrical shell or "can" 12 closed at one, i.e. its upper, end by a dome-shaped end wall 14; a one-piece thick-wall, i.e. heavy-gauge, baseplate 16 secured along its outer margin or periphery directly to the open-bottom edge of the can 12; a filter element 18 permanently encased within the can and being spring-biased against the inner (upper) face of the baseplate by a coil spring 20 reactive between the closed upper end 14 of said can and the upper end cap of said filter element; and an annular sealing gasket 22 interposed between the lower end cap of the filter element and said inner face of the baseplate.

While the filter element 18 may take various forms, illustratively it comprises an annular body of a suitable oil-filtering material or materials such as pleated paper or a depth-type medium disposed to encircle a perforated metal center tube 24 and being held top and bottom by metal end caps 26, 28 affixed to the opposite ends of said center tube, of which the upper end cap is preferably formed with a circular depression 26a closely fitted to and extending a small axial distance into the bore of the center tube and which provides a seat for the lower end of said coil spring 20.

According to the invention, the one-piece baseplate 16 has annular configuration and during the course of its fabrication is provided along its outer margin with a relatively downturned, short-axial length cylindrical flange or skirt 30; along its inner margin with a relatively upturned tubular neck 32 of appreciable axial length and which is interiorly threaded whereby the filter may be mounted directly to engine block by screwing or spinning same on to an externally threaded tubular nipple or pie 34 provided on the latter; and with an annular intermediate portion which in transverse section has reverse-cone configuration.

More particularly, rather than being generally planar or dome-shaped throughout its radial extent, said annular intermediate portion of the baseplate is instead shaped in its outer zone or edge portion which has substantial radial width as an upright truncated cone 30a, from whose larger diameter outer end extends the aforesaid downturned cylindrical flange 30; and in its inner zone or edge portion which has relatively narrow radial width, as reversely inclined truncated cone 30b, from whose smaller diameter end extends the aforementioned upturned tubular neck 32. It is noted that because the altitude of said reversely coned inner zone portion 30b is substantially less than that of said outer zone portion 30a and further because as above stated the upturned neck 32 extends upwardly from the smaller diameter end defining the baseline of the shorter altitude inner zone portion 30b, the position in elevation of the neck 32 is such that it extends well above the bottom line of the filter element 18 and more particularly into the bore of the center tube of the latter.

The aforesaid reverse coning of the outer and inner zone or zone portions 30, 30b of the baseplate 16 with respect to one another also results in the formation on its upper (inner) surface of a circular line-form seat 30s for the filter element 18, the circle of which by design has diameter substantially greater than that of the outer diameter of the upturned tubular neck 32, and preferably also somewhat greater than that of the center tube 24 of said filter element.

It is a feature of the invention that the aforesaid arrangement permits of the sealing gasket 22 which is interposed between the filter element and said circular line-form seat 30s taking the form of a simple planar sealing washer and, recalling that the aforesaid biasing spring 20 functions to press the filter element against the baseplate, it will be appreciated that the aforesaid baseplate construction insures a highly effective seal between the filter element and baseplate being provided. Preferably also, the bottom end cap 28 of the filter element is extended radially inwardly beyond the circle of the center tube 24 thereof and said inward extension (which is designated 28a) is closely fitted along its inner and outer edges to both the inner cylindrical surface of the center tube a) the outer cylindrical surface of the upturned baseplate neck 32, whose axial length as noted with in the foregoing is such that it projects into the bore of the center tube a distance requisite to being engaged by the extension inner edge. It will be appreciated from a consideration of FIG. 1 that the described inward extension 28a of the bottom end cap 28 of the filter element serves to hold the filter-element end cap 28 properly and permanently centered on the circular line-form seat 30s of the baseplate 16.

It is an important feature of the present invention that the aforesaid connection between the smaller diameter end of the inner zone truncated portion 30b of the baseplate 16 and the lower end of the inturned tubular neck 32 thereof be such as to provide an annular, downwardly convex, rounded or radiused corner 30r which is formed "square" with the axis of said tubular neck. By providing the upper edge outer corner of the engine-block nipple 34 to which the filter is to be screwed to operating position with a chamber 34c which is also formed as to be "square" with the nipple axis, the filter, upon first engagement of its baseplate neck 32 with the nipple, will be invariably guided to coaxial relationship therewith, and accordingly the danger or possibility of the threads of the neck and nipple being cross-threaded or mismated when the screwing-on operation is initiated is minimal.

Illustratively, the baseplate 16 is secured along its outer periphery to the open-end edge portion of the filter shell or can 12 in much the same manner as is the thick-wall closure plate of the aforesaid Bowers et al. U.S. Pat. No. 3,067,880 secured to the open-end edge portion of its thin-wall filter shell. That is to say, the lower open-end edge portion or margin of the can 12 which is shown to be interiorly offset as at 12s, thereby to provide same with a locating and holding shoulder against which the baseplate may be held during the edge-seaming operation thus to obviate the need for spot-welding and/or other baseplate-to-can holding means or procedures conventionally required during the edge-seaming operation, is rolled downwardly and thence upwardly over the free edge of the downturned baseplate flange or skirt 30, as effects a mechanical seam therebetween possessing sufficient holding power as to secure the baseplate to the open-bottom edge portion of the can for all normal filter-handling purposes. It will be understood, however, that the aforesaid seam so formed will additionally be rendered oiltight upon the full screwing-on operation of filter to engine-block nipple having been effected, as will be described in the following.

As is more or less conventional, the baseplate 16 is provided with a plurality of circumferentially spaced through openings 40 whose centers are disposed on a circle of radius intermediate the radii of the circles of the end-seamed peripheral edge of the filter and the aforesaid line-form circular seat 30s against which the filter element 18 seats via the gasket 22. When the filter 10 is screwed or spun to its full operating position on the engine block in which it is shown in FIG. 1, said openings 40 serve as oil inlet openings, through which dirty oil to be filtered and which is initially pumped by the oil pump of the engine lubrication system through a cored passage 42 in the engine block to an annular shallow oil chamber 44 disposed in encircling relation about the nipple 34, is forced under pressure to the annular space between the filter shell or can 12 and the filter element 18 encased therein. Upon the oil being filtered consequent to its passage through the filtering medium or media of the filter element, it is returned to the engine lubricating system via the center tube 24 of said element and thence the bore of the engine-block nipple 34.

The filter 10 of the invention is adapted to be screwed or "spun" into its operating position on and simultaneously sealed oiltight to the engine block by first disposing the filter and engine-block nipple in engaging and coaxial relationship, the attainment of which may be readily effected by virtue of the under corner 30r between the baseplate proper and its inverted neck 32 being suitably radiused and formed "square" with the axis of said neck, and of the upper end, outer corner of the nipple 34 being correspondingly chamfered and formed "square" with the nipple axis. The screwing-on operation may be then initiated without any substantial danger or likelihood of the threads of the baseplate neck and of the nipple being cross-threaded or mismated and is continued until the seam or joint between the filter can and the baseplate bears against an annular sealing ring or gasket 50 shown to be seated in a precut, upwardly opening groove 52 provided therefor in the filter-mounting surface of the engine block.

Without further analysis, it will be appreciated that the illustrated and described reverse-cone section of the one-piece baseplate 16 endows same with great strength and hence resistance to being deformed by forces acting thereon in axial direction, such as may develop on the occurrence of excessive engine vibration or when the filter is inadvertently screwed to its operating position on the engine-block nipple with greater than necessary force, or that may result from excessive oil pressure developing in the engine-lubricating system.

The reverse-cone shape of the baseplate according to the invention is of further advantage in that it provides a circular line-form seat for the filter element encased within the filter shell or can against which the filter element may be very readily sealed oiltight by the interposition of a simple flat sealing gasket. Equally if not more importantly, a filter employing the one-piece reverse-cone-shaped base or closure plate constructed according to the invention overcomes a major objectionable feature of presently available filters, namely, the difficulty in initiating the threading-on operation without cross-threading and/or mismating the threads of the baseplate neck with those of the engine-block nipple. As explained above, this difficulty is overcome, or at worst rendered minimal, by the special configuration given the critical neck and nipple surfaces as insures as a practical matter that first engagement of said surfaces will dispose the filter and baseplate nipple in coaxial relationship.

Having thus described my invention, I claim:

1. An oil filter of the spin-on throwaway type comprising: a cylindrical thin-wall shell closed at one end and open at its other end;

an annular thick-wall plate member directly secured along its outer periphery to the open-end edge portion of said shell and serving to close the open end thereof;

said closure plate having an inturned tubular neck projecting from its inner edge and said neck being internally threaded for removable screw-on attachment to an externally threaded engine-block nipple;

said closure plate in its radial portion extending between its said periphery and said tubular neck having reverse-cone section which is such as (1) to provide on the inner surface of said closure plate an axially inwardly directed line-form circular seat having diameter greater than that of said tubular neck; (2) to position in elevation said tubular neck so that it extends well above said line-form circular seat; and (3) to provide at the junction of its said inner edge said tubular neck a downwardly convex circularly extending corner which is "square" with the axis of said neck;

said closure plate further having a plurality of oil inlet openings disposed radially outwardly of said line-form circular seat, through which openings oil to be filtered is directed to the interior space of the closed filter shell;

and an annular filter element seating on the inwardly directed line-form circular seat provided on the inner surface of the closure plate as aforesaid and being disposed in the path of oil flow between the aforesaid inlet openings and the bore of the inturned tubular neck which constitutes the cleaned-oil outlet passage.

2. A spin-on throwaway filter according to claim 1, wherein said reverse-cone section of the closure plate is provided by an outer zone portion of said plate having the shape of a first truncated cone having altitude such that its smaller diameter end portion extends axially into the shell interior and an inner zone portion of said plate having the shape of an oppositely sloped, second truncated cone whose larger diameter end connects to the smaller diameter end of said first truncated cone and whose smaller diameter end connects to the relatively lower end edge of said tubular neck, and wherein the connection between the smaller diameter end of said first truncated cone and the larger diameter end of said second truncated cone defines said line-form circular seat for the filter element and the connection between the smaller diameter end of said second truncated cone and the lower end edge of said inturned tubular neck defines said downwardly convex, radiused corner.

3. A spin-on throwaway filter according to claim 1, wherein the closure plate is provided along its outer periphery with a downturned, short axial-length cylindrical flange, and the open-end edge portion of the shell is mechanically edge-seamed to said flange.

4. A spin-on throwaway filter according to claim 3, and wherein said reverse-cone section of the closure plate is provided by an outer zone portion of said plate having the shape of a first truncated cone whose smaller diameter end portion extends axially into the shell interior and an inner zone portion of said plate having the shape of an oppositely sloped, second truncated cone whose larger diameter end connects to the smaller diameter end of said first truncated cone and whose smaller diameter end connects to the relatively lower end edge of said tubular neck, and wherein the connection between the smaller diameter end of said first truncated cone and the larger diameter end of said second truncated cone defines said line-form circular seat for the filter element and the connection between the smaller diameter end of said second truncated cone and the lower end-edge of said inturned tubular neck defines said downwardly convex, radiused corner.